US 6,659,235 B2

(12) United States Patent
Örtegren et al.

(10) Patent No.: US 6,659,235 B2
(45) Date of Patent: Dec. 9, 2003

(54) BRAKE MECHANISM AND CALIPER FOR A DISC BRAKE

(75) Inventors: Anders Örtegren, Landskrona (SE); Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 09/865,898

(22) Filed: May 25, 2001

(65) Prior Publication Data
US 2002/0017436 A1 Feb. 14, 2002

(30) Foreign Application Priority Data
May 31, 2000 (SE) .............................. 0002058

(51) Int. Cl.$^7$ ........................... F16D 65/16; F16D 55/00
(52) U.S. Cl. ................... 188/73.31; 188/71.1; 188/72.9; 188/72.7
(58) Field of Search ................ 188/73.31, 71.1, 188/72.9, 72.7, 71.8, 71.9, 72.4, 72.5, 73.43, 73.44, 73.45

(56) References Cited

U.S. PATENT DOCUMENTS

| 3,517,777 A | 6/1970 | Beller ....................... 188/73.1 |
| 3,724,616 A | 4/1973 | Burnett ....................... 188/345 |
| 3,734,243 A | 5/1973 | Girauldon ................... 188/72.4 |
| 3,741,350 A | 6/1973 | Knapp ....................... 188/72.6 |
| 3,830,343 A | 8/1974 | Gardner ..................... 188/71.8 |
| 3,837,437 A | 9/1974 | Martins ..................... 188/71.8 |

(List continued on next page.)

FOREIGN PATENT DOCUMENTS

| DE | 26 03 109 | 1/1976 |
| DE | 261 4321 | 3/1976 |
| DE | 26 14321 C2 | 4/1976 |
| DE | 26 49 666 | 10/1978 |
| DE | 32 13 356 A1 | 4/1982 |
| DE | 33 48 359 C2 | 10/1983 |

(List continued on next page.)

OTHER PUBLICATIONS

A Comparative Overview of Air Disc Brake Designs Feb. 1982.
Mechanische Gleitsattelbremsen Aug. 1992.
Scheibenbremse D3 Lucas P102 Aug. 1992 6 pages
Scheibenbremse 1000 V–GP103 Feb. 1994 3 pages.
Proceedings of the Institute of Mechanical Engineers International Conference for Commercial Vehicles Design and Development of Disc Brakes Nov. 1988.
Bendix Heavy Vehicle Systems Group brochure listing features of theBendix Air Disc Brake undated.
Die Knorr–Scheibenbremse–Feststellbremse undated.
Colette Bremsenbauarter undated.
Engineering drawing of an Allied Signal/Bendix Espana Air Disc Brake No date.
Engineering drawing of an Bendix Air Disc Brake Type 3700 No date.
Engineering drawing of an Bendix Air Disc Brake Type 4300 No date.
Engineering drawing of an Allied Signal/Bendix Espana Air Disc Brake No date.

*Primary Examiner*—Douglas C. Butler
(74) *Attorney, Agent, or Firm*—St. Onge Steward Johnston & Reens LLC

(57) ABSTRACT

The present invention concerns a brake caliper and a brake mechanism for a disc brake received in the caliper. The brake mechanism comprises a brake lever, a cross bar, one or more thrust plates and a cover. The caliper is of an open design having an opening in the wall furthest from the brake disc. A bearing bracket is mounted from the inside of the caliper in the opening.

17 Claims, 11 Drawing Sheets

U.S. PATENT DOCUMENTS

| | | | | |
|---|---|---|---|---|
| 3,937,304 A | 2/1976 | Brix | ............................ | 188/73.5 |
| 3,967,705 A | 7/1976 | Johannesen | ................. | 188/71.9 |
| 4,018,310 A | 4/1977 | Ritsema | ...................... | 188/73.3 |
| 4,071,118 A | 1/1978 | Johannesen | ................. | 188/71.9 |
| 4,109,765 A | 8/1978 | Johannesen | ................. | 188/72.7 |
| 4,184,571 A | 1/1980 | Karasudami | ................ | 188/72.7 |
| 4,222,310 A | 9/1980 | Garrett | ......................... | 92/128 |
| 4,378,863 A | 4/1983 | Baum | ......................... | 188/71.8 |
| 4,465,164 A | 8/1984 | Anderson | ................. | 188/73.44 |
| 4,522,286 A | 6/1985 | Villata | ........................ | 188/72.7 |
| 4,681,194 A | 7/1987 | Tsuruta | ...................... | 188/71.9 |
| 4,693,341 A | 9/1987 | Drott | .......................... | 188/72.7 |
| 4,705,147 A | 11/1987 | Pressaco | ..................... | 188/196 |
| 4,809,822 A | 3/1989 | Margetts | ..................... | 188/72.7 |
| 5,433,298 A | 7/1995 | Antony | ....................... | 188/72.7 |
| 5,547,048 A | 8/1996 | Antony | ....................... | 188/72.9 |
| 5,590,742 A | 1/1997 | Gutelius | ................... | 188/70 R |
| 5,833,035 A | 11/1998 | Severinsson | ................ | 188/72.7 |
| 5,927,445 A | 7/1999 | Bieker | ........................ | 188/72.9 |
| 5,960,914 A | 10/1999 | Isai | ............................ | 188/72.8 |
| RE37,231 E * | 6/2001 | Severinsson | ................ | 188/72.7 |
| 2002/0014376 A1 * | 2/2002 | Ortegren et al. | .......... | 188/73.31 |
| 2002/0023807 A1 * | 2/2002 | Ortegren et al. | .......... | 188/73.31 |

FOREIGN PATENT DOCUMENTS

| | | |
|---|---|---|
| DE | 34 23 875 A1 | 6/1984 |
| DE | 33 48 369 A1 | 3/1986 |
| DE | 33 48 369 C2 | 3/1986 |
| DE | 37 16 202 A1 | 5/1987 |
| DE | 37 16 202 C2 | 5/1987 |
| DE | 40 32 885 A1 | 10/1990 |
| DE | 40 32 886 A1 | 10/1990 |
| DE | 41 31 631 A1 | 9/1991 |
| DE | 43 07 019 A1 | 3/1993 |
| DE | 36 10 569 C2 | 2/1994 |
| DE | 195 15 063 | 4/1995 |
| EP | 0 145 535 | 10/1984 |
| EP | 0 182 336 B1 | 11/1985 |
| EP | 0 271 864 A3 | 12/1987 |
| EP | 0 271 864 A2 | 12/1987 |
| EP | 0 436 906 B1 | 12/1990 |
| EP | 0 478 917 A1 | 7/1991 |
| EP | 0 495 311 A1 | 12/1991 |
| FR | 76 09298 | 10/1976 |
| GB | 2 090 355 | 12/1981 |
| GB | 2 102 088 | 7/1982 |
| JP | 64-6423 | 2/1989 |
| JP | 3-2022 | 1/1991 |
| JP | 4-14670 | 4/1992 |
| JP | 4-29141 | 7/1992 |
| SU | 165 7070 A3 | 5/1985 |
| WO | WO96/12900 | 5/1996 |

\* cited by examiner

BRAKE MECHANISM AND CALIPER FOR A DISC BRAKE

CROSS REFERENCE OF PENDING APPLICATION

This application claims priority of pending Swedish Patent Application No. 0002058-6 filed on May 31, 2000.

TECHNICAL FIELD

The present invention concerns a brake caliper and a brake mechanism for a disc brake. The brake mechanism is received in said caliper. The caliper is furnished with an opening for receiving a bearing bracket of the brake mechanism.

The brake mechanism according to the present invention is primarily intended for a heavy road vehicle but may quite as well be used for a lighter road vehicle or a rail vehicle.

PRIOR ART

It is previously known to furnish a brake caliper having a cover attached from the outside. See e.g. WO 96/12 900. The brake mechanism is held together as a unit during assembly. In this type of caliper there where problems concerning the sealing of the cover etc.

To improve the above concept a closed caliper was developed in which the brake unit is mounted from the other side as compared to the above caliper having a cover. See e.g. DE,C,195 15 063. This solution may give difficulties concerning strength of the bearing cages, assembly of the brake mechanism and machining of the caliper.

SUMMARY OF THE INVENTION

One object of the present invention is to avoid the problems of the above disc brakes according to the prior art.

This is done according to the invention by furnishing the caliper with an opening in the wall furthest from the brake disc. Thus, the caliper will have an open design and is in this description referred to as an open caliper. A bearing bracket is mounted from the inside of the caliper in said opening.

By having a bearing bracket placed in an opening of the caliper it is possible to have a stronger bearing design and it is possible to make the bearing bracket of a different material. The bearing bracket gives a stiffening of the caliper design. As the gearing of the adjuster mechanism is placed as one unit in the bearing bracket it is easier to have high precision in the gears, compared to if the gears are placed in different units. Machining of the caliper may be done through the opening of the caliper, which is beneficial. Furthermore, the bearing bracket provides for improved parallel setting of the thrust units at assembly, simplified mounting in the caliper, and simplified maintenance. Pre-assembly of different parts with the bearing bracket to one unit gives higher quality for different functions, including synchronism, adjustment mechanism and force amplification.

One function of the bearing bracket is to take up the reaction clamp force of the brake mechanism and transmitting it to the caliper.

The brake mechanism of the present invention is preferably pneumatically actuated, but it may also be hydraulically or electrically actuated.

Further objects and advantages of the invention will be obvious for a person skilled in the art from reading the description below.

BRIEF DESCRIPTION OF THE DRAWINGS

An embodiment of the invention will be more closely described below as a way of example and by reference to the enclosed FIGS., in which.

DETAILED DESCRIPTION OF PREFERRED EMBODIMENTS

Figure 1A:
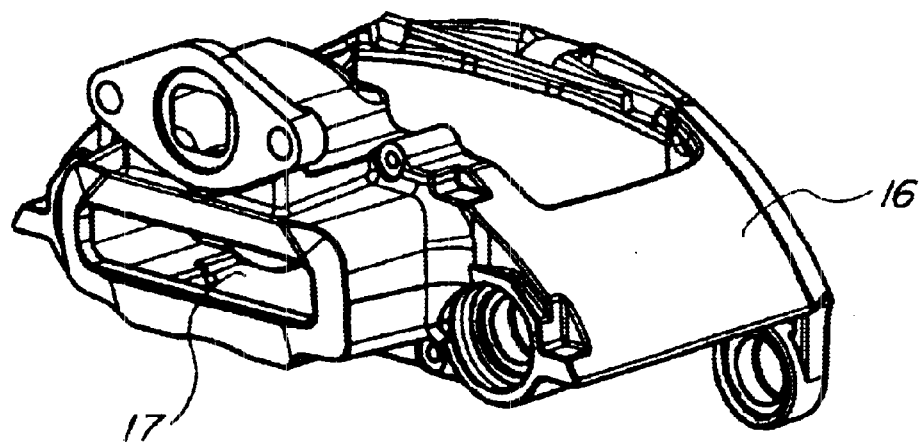
FIGS. 1a and 1b are a perspective view and a cross section, respectively of a open caliper according to the invention.
Figure 1B:
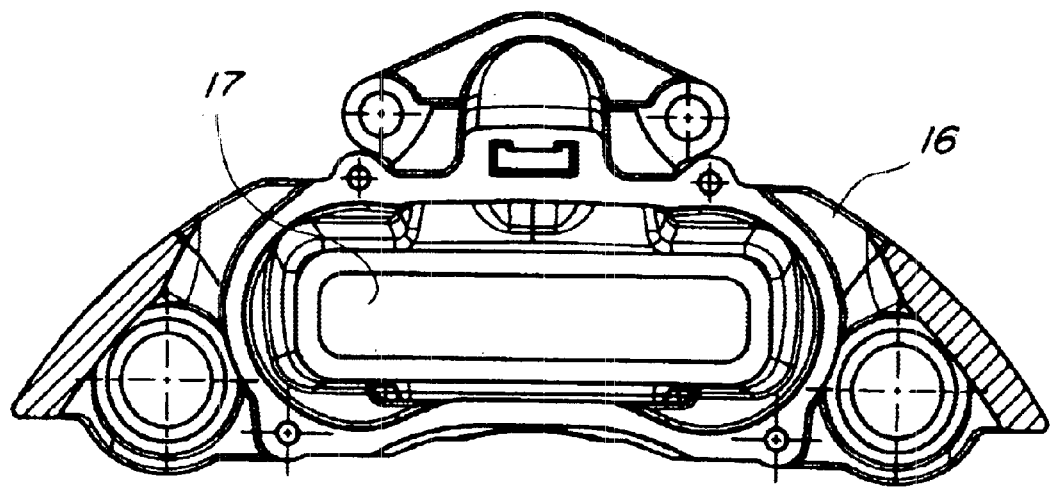
Figure 2:
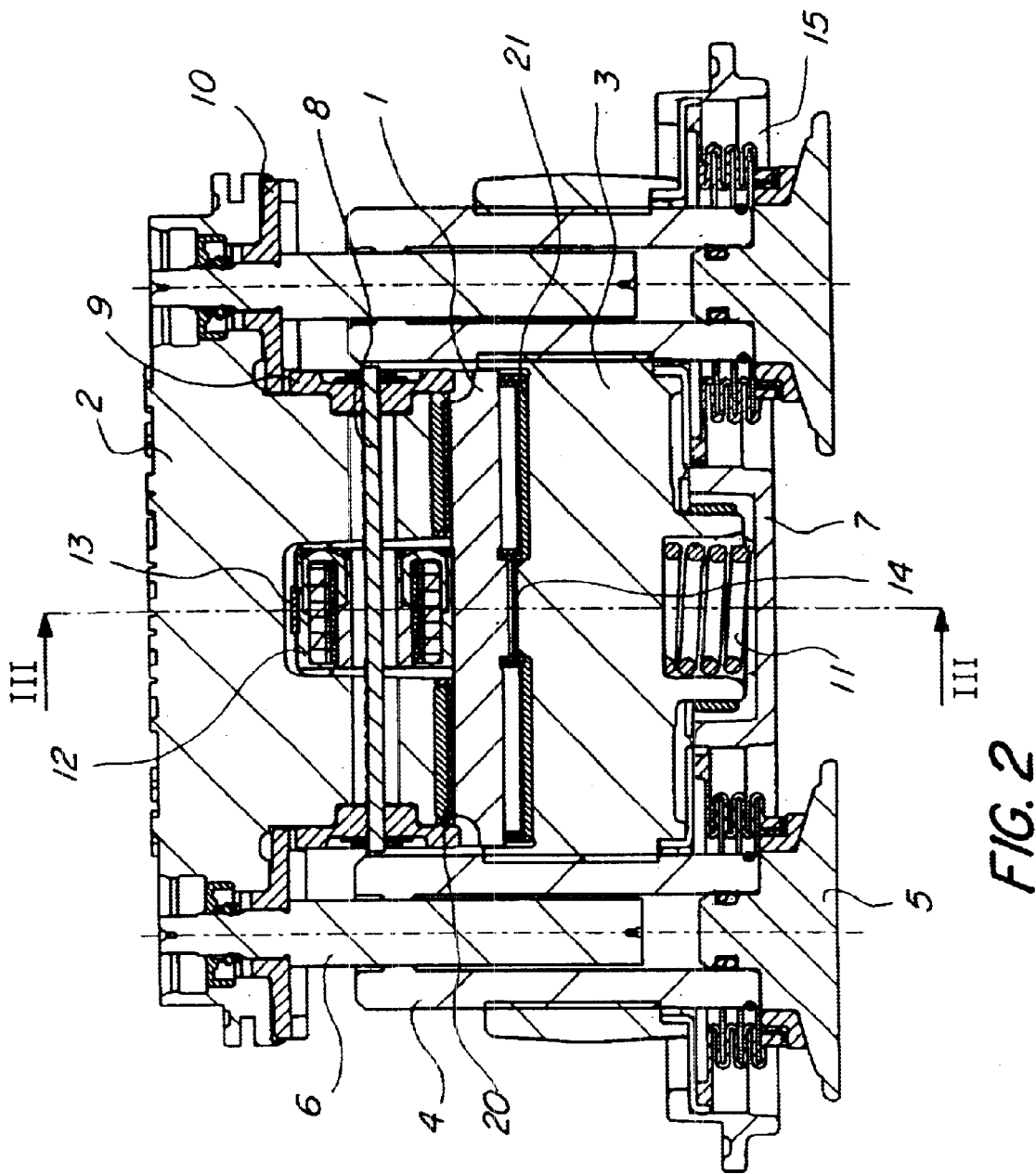
FIG. 2 is a cross section of a brake mechanism according to the invention.
Figure 3:
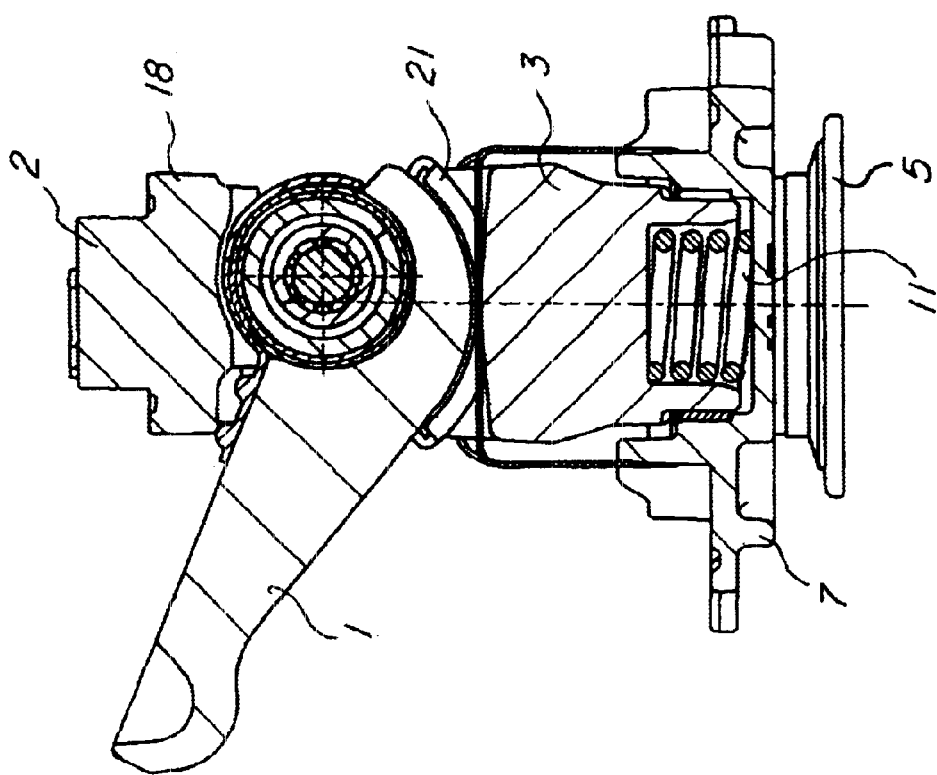
FIG. 3 is a cross section of the brake mechanism of FIG. 2 taken along the line III—III.
Figure 4:
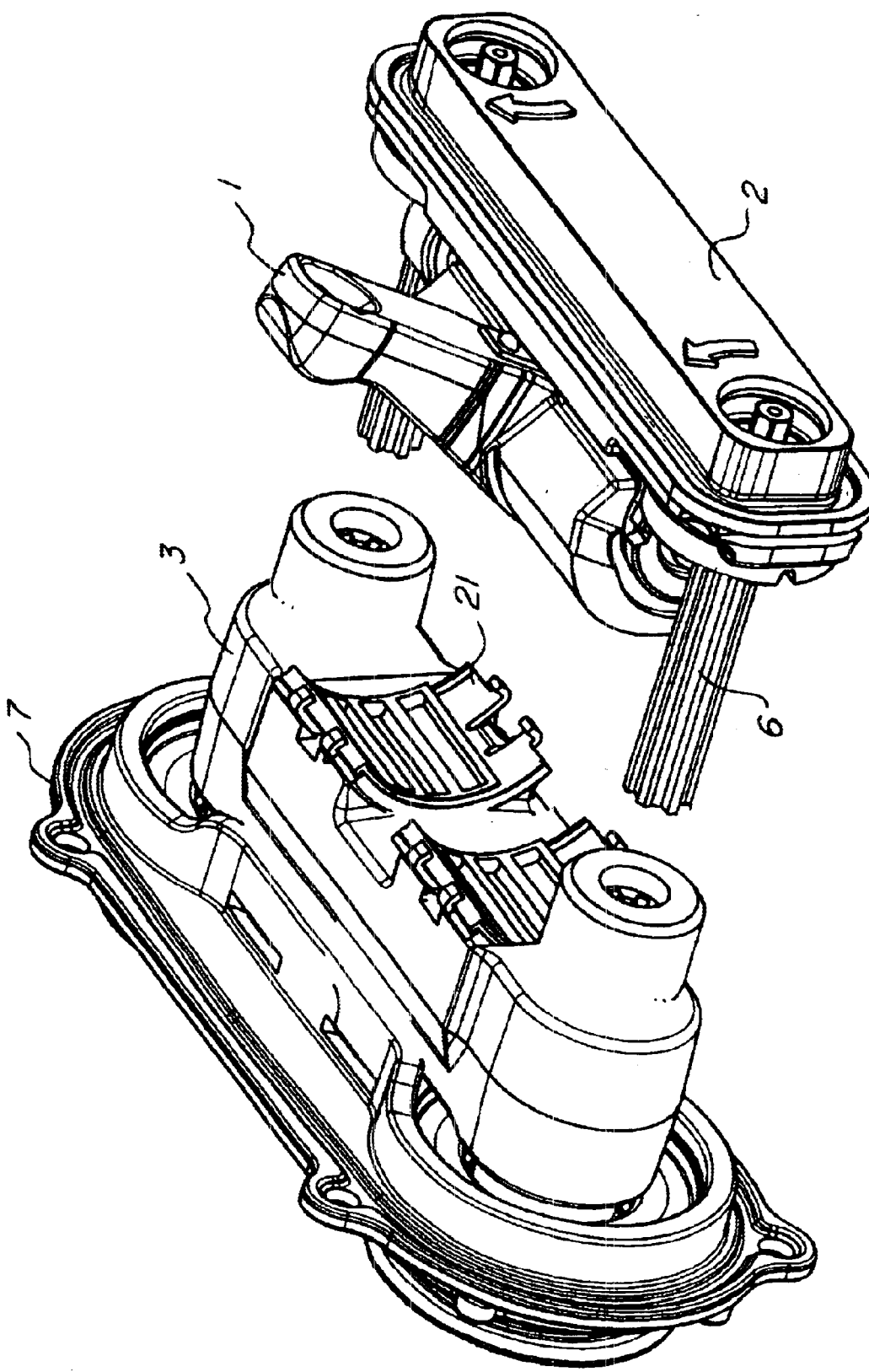
FIG. 4 is a perspective view of the brake mechanism of FIGS. 2 and 3, showing the two units forming the brake mechanism.

The brake mechanism of the invention comprises a lever 1 mounted in a bearing bracket 2, to be received in an opening 17 of the caliper 16. The lever 1 acts on a cross bar 3. The lever 1 is supported by roller bearings 20,21 placed in the bearing bracket 2 and the cross bar 3, respectively. In some embodiments the roller bearing of the bearing bracket 2 is replaced by a plain bearing. The cross bar 3 has two threaded openings each receiving an adjustment screw 4. Thus, the adjustment screws 4 are rotatably mounted in the cross bar 3. Each adjustment screw 4 is provided with a thrust plate 5, which is to act on a brake pad holder (not shown) or the like. The brake pad will go into contact with the brake disc during activation of the brake. As is known a further brake pad is arranged on the opposite side of the brake disc. The further brake pad is in a known way brought into contact with the brake disc in that the open caliper 16 is moved at the activation of the brake. In the bearing bracket 2 two adjustment and reset shafts 6 are mounted. When the brake mechanism is assembled the adjustment and reset shafts 6 will be received inside the adjustment screws 4. The adjustment and reset shafts 6 are axially moveable but non-rotatably connected to the adjustment screws 4. Furthermore, the brake mechanism comprises a cover 7 fixed to the open caliper 16 at assembly. Between the bearing bracket 2 and the lever 1 a synchronising shaft 8 is mounted, having pinions 9 at each end. The pinions 9 are coupled to crown wheels 10 non-rotatably connected to the adjustment and reset shafts 6. The synchronising shaft 8 carries an adjuster mechanism 12 of known design. A return spring 11 is positioned between the cover 7 and the cross bar 3 in order to bring the brake mechanism back to its rest position. The pinions 9, crown wheels 10, synchronising shaft 8 and the adjuster mechanism 12 forms a synchronising unit, synchronising the movements of the adjustment and reset shafts 6.

The brake mechanism forms two units or modules. One unit consists of the lever 1, the synchronising unit and the adjustment and reset shafts 6 all mounted in the bearing bracket 2. In order to keep these parts together as a unit a clip 13 is furnished to hold the lever 1. The cross bar 3, the cover 7, the return spring 11, the adjustment screws 4 and the thrust plates 5 form the second unit of the brake mechanism. The second unit is held together by means of a sweep 14. In an alternative embodiment (not shown) the brake mechanism forms a single unit, in which case a sweep or the like will go between the bearing bracket 2 and the cover 7. In further alternative embodiments the different units of the brake mechanism consists of other parts, i.e. the brake mechanism may be divided in different location, and the brake mechanism may be divided in more than two units. Normally the brake mechanism consists of at least two units.

To protect the brake mechanism from road dirt bellows 15 are placed between the thrust plates 5 and the cover 7. In the shown embodiment the bellows 15 are placed in a heat protection ring.

The bearing bracket 2 is received in an opening 17 of the caliper 16. The opening 17 is placed in the wall of the caliper 16 furthest from the brake disc. Thus, the caliper is of an open design. The bearing bracket 2 has a shoulder 18 abutting the inside of the caliper 16 and thus, the bearing bracket 2 is placed in the opening 17 of the caliper 16 from the inside. The reaction of the clamp force of the brake is transmitted by means of the bearing bracket 2 to the open caliper 16. The force of reaction is transmitted via the shoulder 18 of the bearing bracket 2. As the force of reaction is transmitted by means of the shoulder 18 of the bearing bracket 2 the force is transmitted in a area surrounding the opening 17 of the caliper 16. The bearing bracket 2 is a loaded part of the brake mechanism and, thus, the bearing bracket 2 and its shoulder 18 should have enough strength to transmit the force of reaction. A person skilled in the art realises that the shoulder may be placed in the caliper in stead of the bearing bracket, in which case the force of reaction will be transmitted via the edge area of the bearing bracket to the shoulder of the caliper.

A sealing is placed between the bearing bracket 2 and the open caliper 16. The sealing between the bearing bracket 2 and the open caliper 16 is received in a groove of the bearing bracket 2. The groove and thus the sealing may be placed in any position axially or radially in the bearing bracket 2. The inside of the open caliper 16 may be machined via said opening 17 of the caliper 16.

During assembly of the second module it is important that parallelism is established and kept between the thrust units. If there is no parallelism the brake pads will have an uneven wear, which may jeopardise the function of the disc brake.

Figure 5:
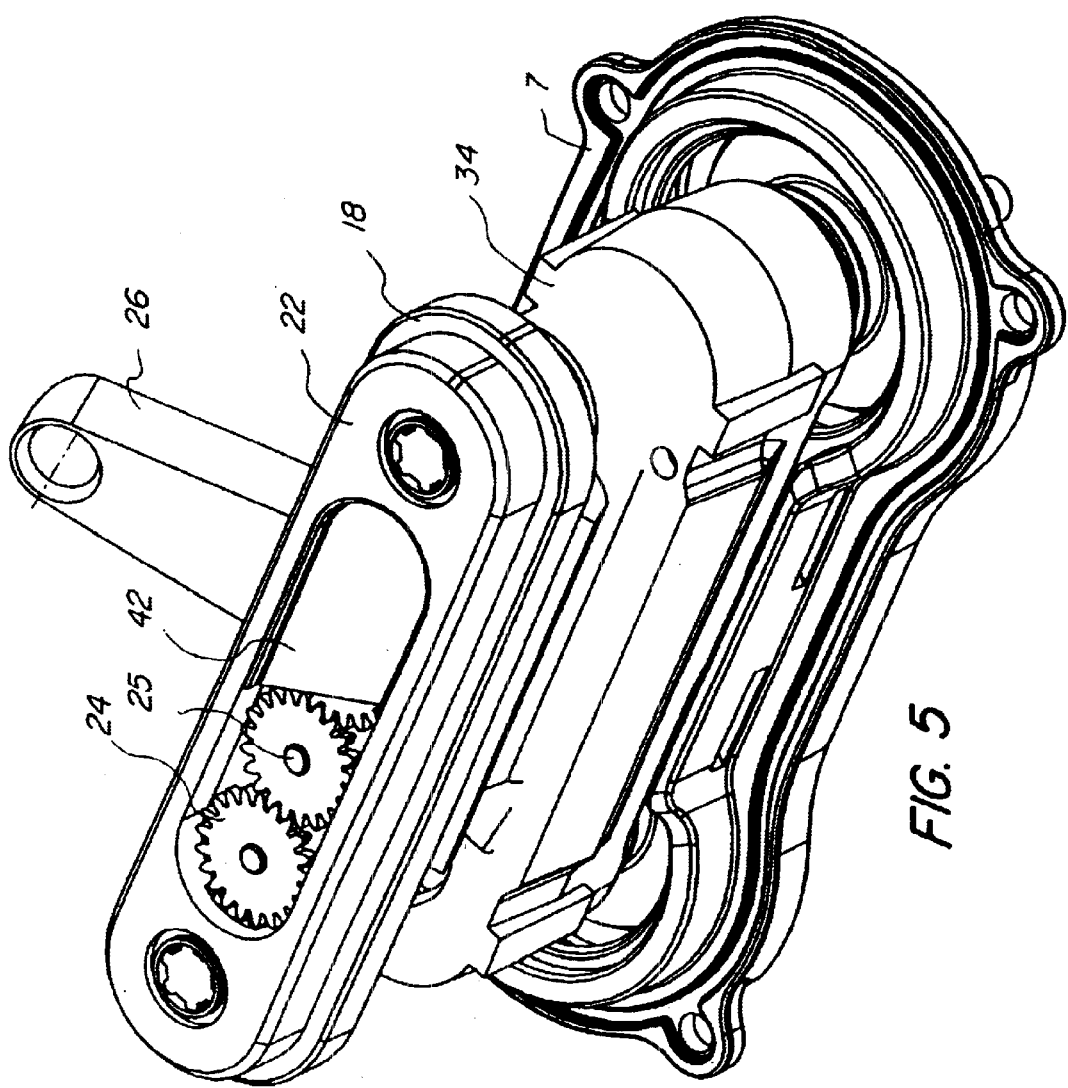
FIG. 5 is a perspective view of a second embodiment of a brake mechanism.

In a second embodiment of the brake mechanism the form of the synchronising unit is altered. The synchronising unit is still placed in a bearing bracket 22 to be received in the opening 17 of the caliper 16. An adjuster mechanism 23 of known construction is placed on top of one of the adjustment and reset shafts 6. In the bearing bracket 22 a number of gear wheels 24 are placed between gear wheels of the adjustment and reset shafts 6. Each gear wheel is placed on a pin 25 fixed to the bearing bracket 22. The gear wheels 24 are placed under a cover 42 received in the bearing bracket 22. In FIG. 5 the cover 42 is shown partially broken away for clarity. In the shown example there are four gear wheels 24 between the gear wheels of the adjustment and reset shafts 6. A person skilled in the art realises that other numbers of gear wheels may be used. As in the previous embodiment the lever 1, bearing bracket 22 and the adjustment and reset shafts 6 form one unit. This unit is joined with a second unit, formed by the other parts of the brake mechanism when the disc brake is assembled.

In this embodiment the lever 26 is supported by means of a plain bearing received in the bearing bracket 22. The lever 26 acts on the cross bar 3 by means of an intermediate part 27. The intermediate part has the form of a rocker 29 in this embodiment but may have other forms in another embodiments.

The bearing bracket 22 has a protruding part 32 with a cylindrical surface for co-operation with a cylindrical surface of the lever 26. A plain bearing may be placed between the lever 26 and the protruding part 32 of the bearing bracket 22.

The rocker 29 has a cylindrical surface in contact with the cylindrical surface of the lever 26. The rocker 29 is received in a groove 35 of the cross bar 34. In the end positions of the movement of the rocker 29 it will abut the sides of the groove 35. The contact surfaces of the groove 35 and the rocker 29 are both cylindrical. In an alternative embodiment a cylindrical stud is placed between the rocker 29 and the bottom of the groove 35.

In the embodiment of FIGS. 8 to 11 the lever 31 has a protruding part received in a slide bearing 33 of the bearing bracket 30. The lever 31 acts on an intermediate part 27 in form of a stud 28, which acts on the cross bar 34.

In a further embodiment the lever is turned around compared to the previous embodiments. The turning is made in such a way that the intermediate part 27 and the lever change places. Thus, in this embodiment the intermediate part 27 will be received in the bearing bracket and the lever will be in direct contact with the cross bar.

The surface of the part of the lever 26,31 in contact with the intermediate part 27 has an optionally cylindrical form with a radius R1 in relation to the point of rotation for the lever. The intermediate part 27 is supported in the cross bar 34 via a roller bearing. The intermediate part 27 has two flanges between which the lever 26,31 is received. The surface of the intermediate part 27 in contact with the lever 26,31 is cylindrical having a radius R2. The lever 26,31 has an elongated part the upper part of which cooperates with the actuator. At the opposite end the lever 26,31 has a protruding part or a recess received in a recess or protruding part, respectively of the bearing bracket 22,30. Thus, the lever 26,31 is supported between the bearing bracket 22,30 and the intermediate part 27.

When the brake is applied the lever 26,31 will rotate in the slide bearing 33 of the bearing bracket 22,30. The positions of the points of rotation for the lever 26,31 and the intermediate part 27 are offset from each other. By varying the radiuses R1,R2, the offset and the length of the lever 26,31 it is possible to vary the force amplification characteristics of the brake mechanism.

Figure 6:
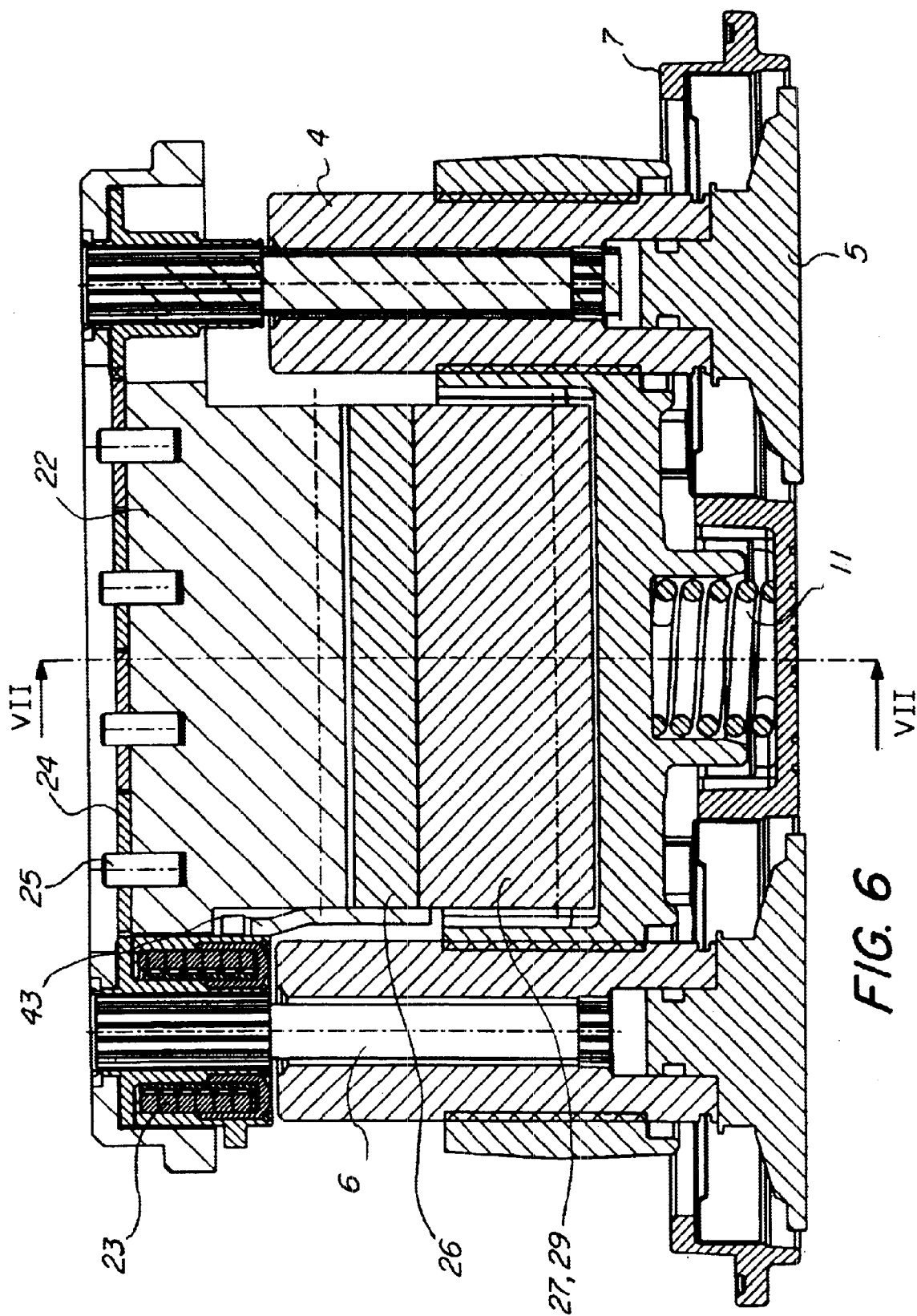
FIG. 6 is a cross section of the brake mechanism of FIG. 5 taken along the line VI—VI of FIG. 7.
Figure 7:
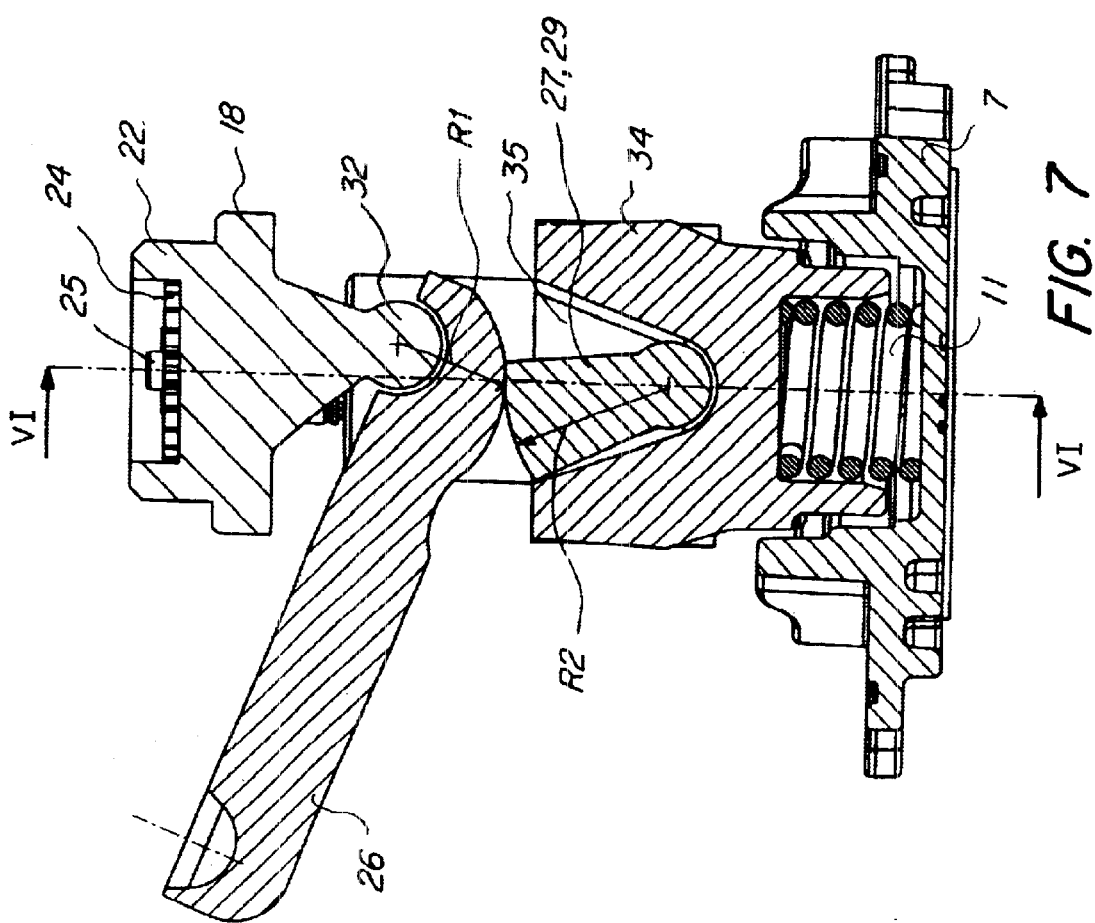
FIG. 7 is a section of the brake mechanism of FIG. 6 taken along the lines VII—VII.
Figure 8:
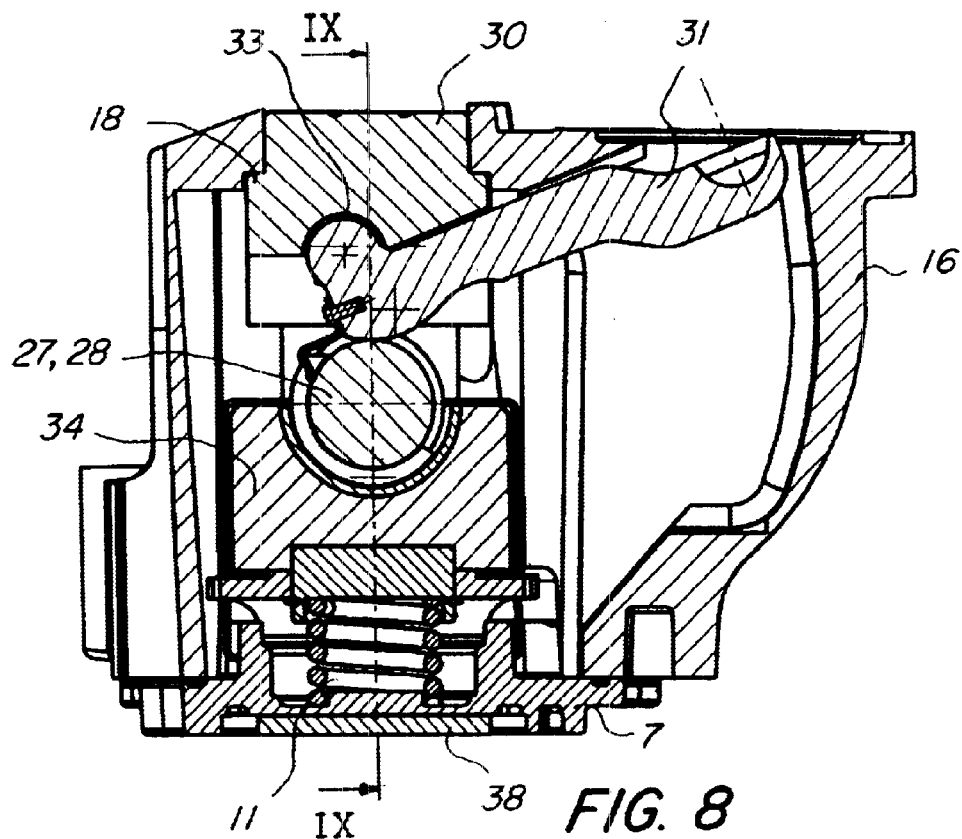
FIG. 8 is a cross section of the caliper and a further alternative embodiment of the brake mechanism of the invention taken along the lines VIII—VIII of FIG. 9.
Figure 10:
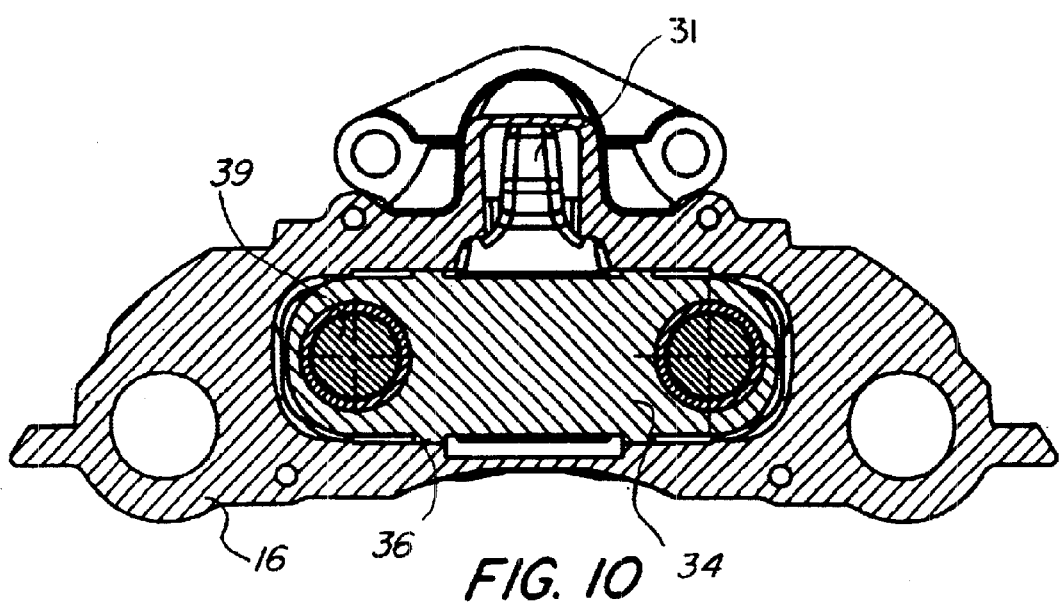
FIG. 10 is a cross section taken along the line X—X of FIG. 9.
Figure 9:
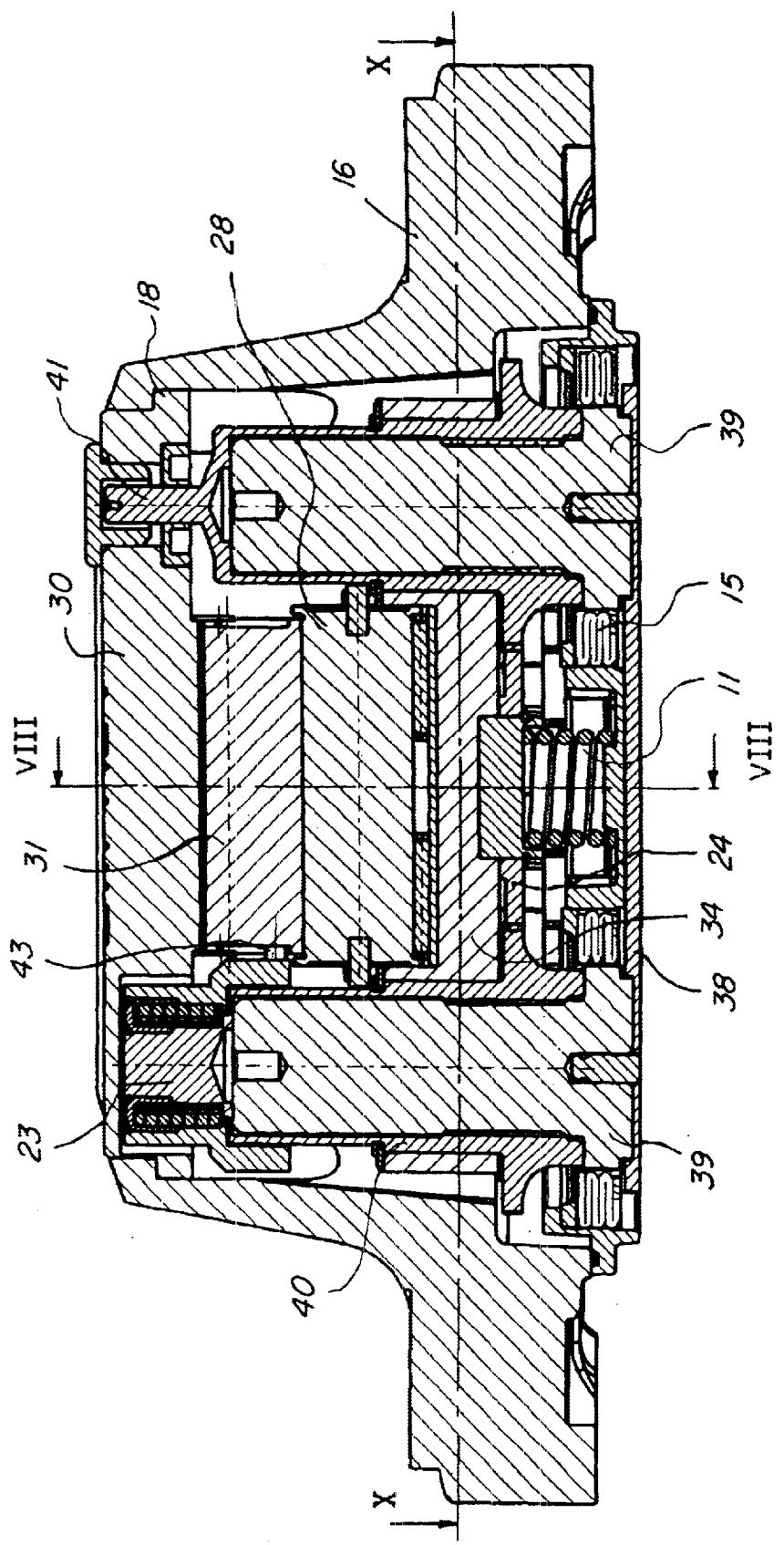
FIG. 9 is a cross section taken along the lines IX—IX of FIG. 8.
Figure 11:
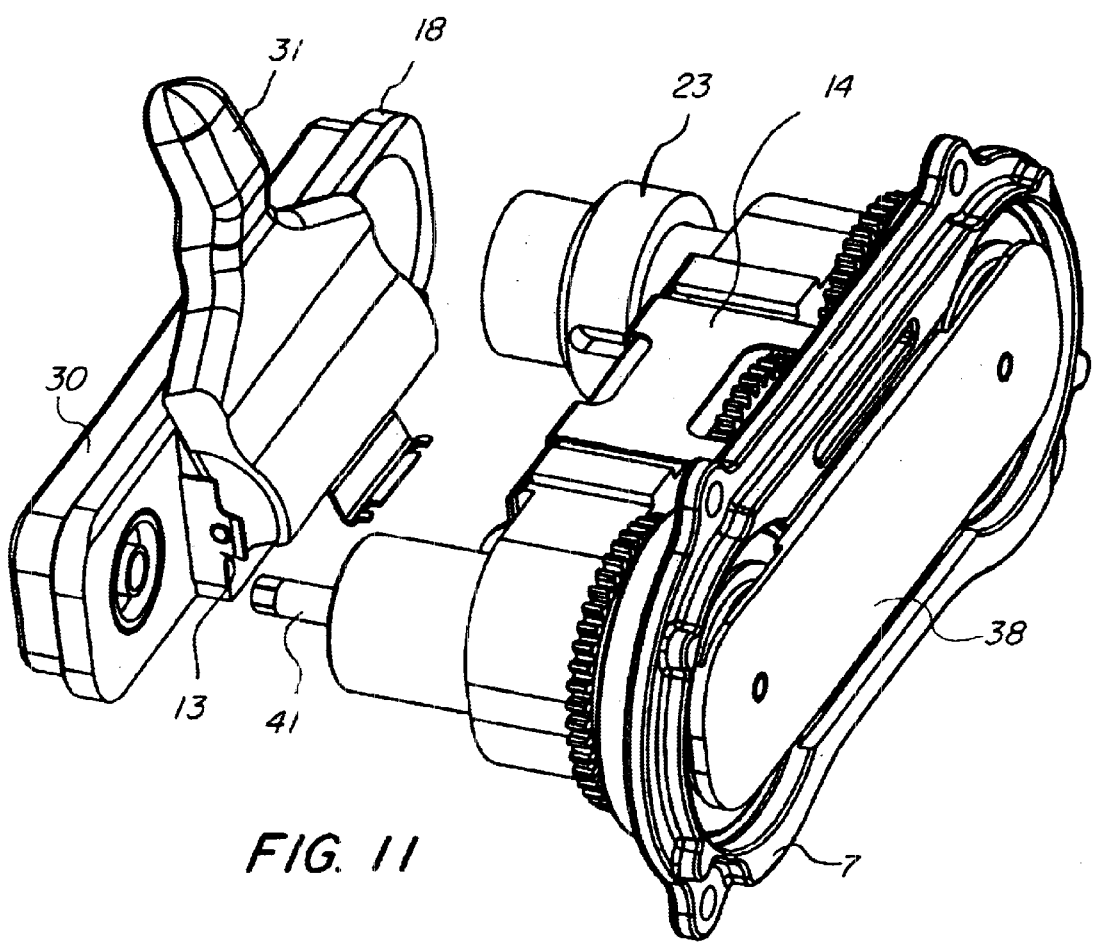
FIG. 11 is a perspective view of the brake mechanism of FIGS. 8 to 10.

In the embodiment of FIGS. 8 to 11 (as well as the embodiment of FIGS. 5 to 7) the cross bar 34 is supported by four protruding parts 36 of the cross bar and the return spring 11 in the cover 7. The protruding parts 36 of the cross bar 34 abut the inside of the open caliper 16. The part of the caliper 16 in contact with the protruding parts of the cross bar 34 is machined to give a smooth surface. The machining is done via the opening 17 of the open caliper 16. The return spring 11 is guided in an opening in the cross bar 34 and acts between the cross bar 34 and the cover 7. The return spring 11 is received in a holder of the cover 7. The cross bar 34 is free to move in the thrust direction along the machined part and in one direction perpendicular to the thrust direction. The latter direction is the tangential direction of the brake discs. In an alternative embodiment the cross bar 34 is guide on guide sleeves (not shown) placed around the screws that are used to fix the cover 7 to the open caliper 16.

When the brake is activated the lever 31 will press the cross bar 34 and thus the thrust plate 38, via the thrust screws 39 and the brake pads in direction towards the brake disc (not shown). When the brake pads hits the brake disc, the pads will move in the tangential direction of the brake disc a short distance before the brake pads hit a support (not shown). The movement in the tangential direction of the brake disc is normally not more than a few millimetres. The lever 31, the intermediate part 27, the cross bar 34 and the thrust units of the brake mechanism will follow the brake pads in their movement. During this movement the lever 31 will slide in the plain bearing 33. The cross bar 34 will move in the tangential direction of the brake disc guided by the protruding parts 36 of the cross bar 34 or the guide sleeves. The cover 7 is fixed to the caliper 16 and will not move. The movement between the cross bar 34 and the cover 7 is taken up by the return spring 11. When the brake is released the return spring 11 will bring the cross bar 34 back to its centred position. The lever 31, the intermediate part 27 and the thrust units will move with the cross bar 34 into the centred position. Thus, the return spring 11 resets the brake mechanism both in the thrust direction and sideways. The above also apply for the embodiment of FIGS. 5 to 7.

The cover 7 is fixed to the open caliper 16 by means of screws. The cover 7 has openings to receive the thrust units. There is a clearance between the cover 7 and the thrust units allowing the thrust units to move in any direction in relation to the cover 7.

The thrust units are in one embodiment connected with a thrust plate 38, which thrust plate 38 acts on a brake pad. The thrust units each comprises a thrust screw 39. The thrust screws 39 have an opening at the bottom, which receives a stud on the thrust plate 38. The studs of the thrust plate 38 and the openings of the thrust screws 39 are formed to lock the thrust screws 39, thus hinder them from rotating. This is important for control of the distance between the brake pads and the brake disc.

One of the thrust units is further furnished with the adjuster mechanism 23 as stated above and an adjuster shaft 40. The adjuster mechanism 23 is placed on top of the thrust screw 39. The other thrust unit is furnished with a reset shaft 41. The shafts 40,41 are drivingly connected by means of a set of gear wheels 24. As stated above the set of gear wheels 24 may be placed in the bearing bracket 30. In another embodiment the seat of gear wheels 24 are placed between the cover 7 and the thrust plate 38.

The adjuster mechanism 23 co-operates with the lever 26,31 by means of a lever pin 43. The shafts 40,41 and the screws 39 of the thrust units may rotate relative each other, which is of importance for adjustment of slack in the disc brake. The shafts 40,41 have the form of sleeves placed on the outside of the thrust screws 39.

The adjuster mechanism 23 is of a known construction. When the brake is applied the lever pin 43 will act on the adjuster mechanism 23. When the A-distance has been traversed the housing of the adjuster mechanism 23 is forced to rotate anti-clockwise. The A-distance determines the clearance between the brake pads and the brake disc when the brake is not activated.

During an application stroke the A-distance will first be traversed. At the continued application stroke the lever pin 43 will rotate the housing of the adjuster mechanism 23. This rotation will be transferred to the adjuster shaft 40. The adjuster shaft 40 will rotate in relation to the thrust screws 39. The adjuster shaft 40 and the reset shaft 41 will be rotated concurrent by means of the set of gear wheels 24. By the rotation of the shafts 40,41 the position of the thrust plate 38 in relation to the brake disc will be altered. This will decrease the slack, if the slack between the brake pads and the brake disc is excessive of a set control distance, until a counter-force and thus a torque is built up when the brake pads engage the brake disc. The force transmission during adjustment occurs by means of a one-way spring drivingly acting between a driving ring and an adjuster hub of the known adjuster mechanism 23. When the brake pads are in engagement with the brake disc, the torque is such that slip will occur between the housing and the adjustment spring inside the adjuster mechanism 23 at further rotation of the housing.

During the release stroke no torque is transmitted by the one-way spring, which slips in the direction of rotation. If the slack between the brake pads and the brake disc was excessive and this slack has been taken up by rotation of the thrust screws 39 in relation to the cross bar 34, this new relative position will be maintained during the release stroke.

The reset shaft 41 is furnished with a suitable head to receive a tool used to reset the thrust units when the brake pads are to be replaced. This movement will be transferred to the adjuster shaft 40 by means of the set of gear wheels 24. The reset shaft 41 is rotated in the normal way until the distance between the thrust plates and the brake disc is sufficient to receive the new brake pads. Then the reset shaft 41 is rotated in such a way that the distance between the thrust plates and the brake disc corresponds to the desired running clearance. The reset shaft 41 is received in a sealed opening of the bearing bracket 30.

Figure 12:
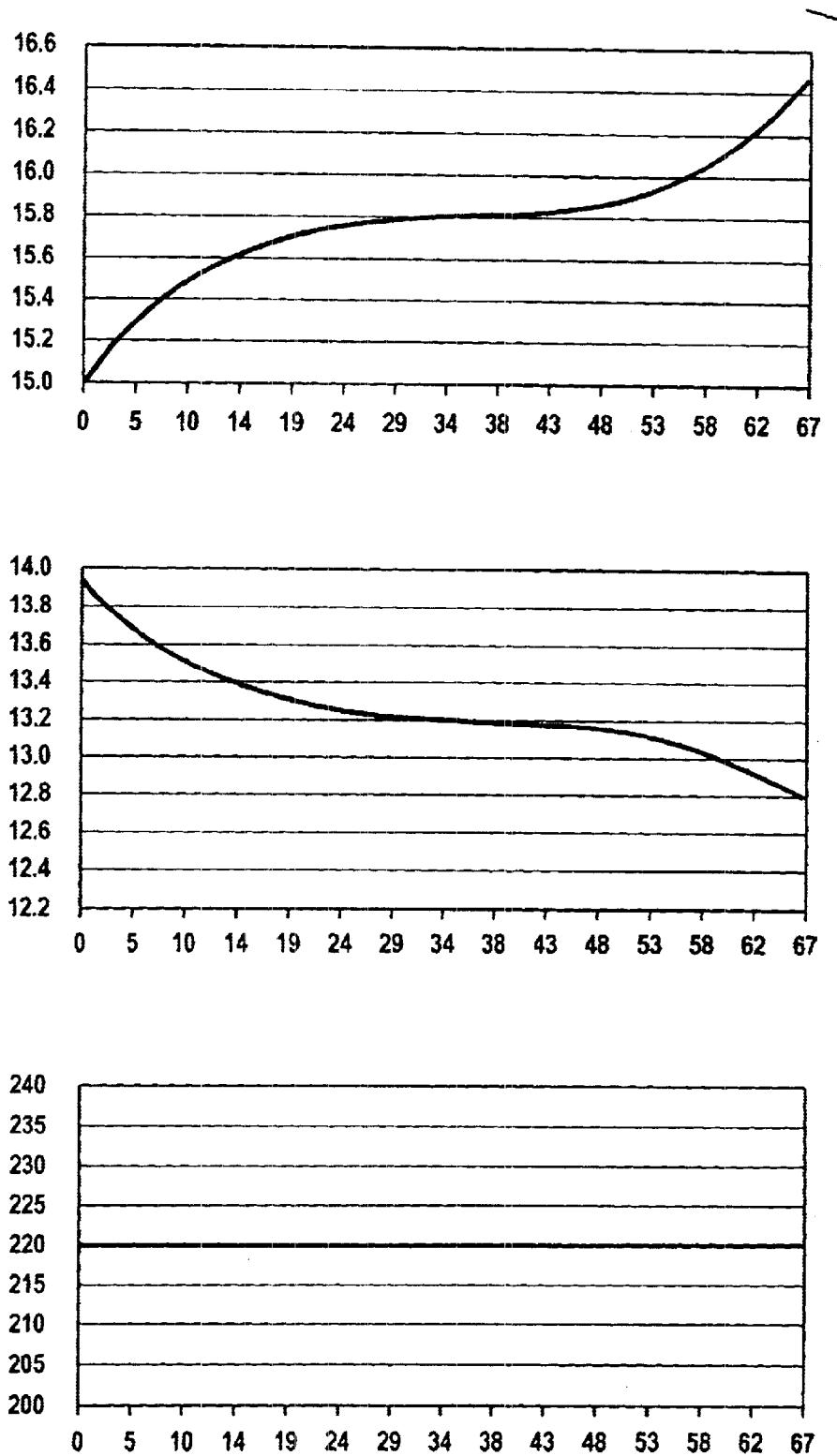
FIG. 12 shows schematically three graphs relating to the force versus stroke of different parts of the brake mechanism.

As stated above it is possible to control the force amplification characteristic of the brake mechanism, by varying the radiuses R1,R2 of the lever 26,31 and intermediate part 27, respectively, the offset between the points of rotation of the lever 26,31 and the intermediate part 27 and/or the length of the lever 26,31. In an ideal situation the force should be the same independent of the length of the stroke for the lever 26,31. If a pneumatic cylinder is used to actuate the brake lever 26,31, such a cylinder normally gives a force dependant on stroke length as indicated in the middle graph of FIG. 12. As shown in the graph, the force follows a sloping curve, having a stronger inclination at the beginning and end of the stroke. By making the variations as stated above it is possible to form a characteristic for the force versus stroke length, which is a mirror image of the characteristic of the pneumatic cylinder. A suitable characteristic for the force versus length of stroke of the lever 26,31 is shown in the upper graph of FIG. 12. The result of the two characteristics will be a force executed on the brake pads which is independent of the stroke length as indicated in the lower graph of FIG. 12.

Thanks to the module form of the brake mechanism it is easy to change lever 26,31 and bearing bracket 22,30 in order to make the alterations of the force amplification characteristics as stated above.

During assembly of the brake mechanism the module consisting of the lever 1,26,31 and bearing bracket 2,22,30 is first brought into the caliper 16, then the other module is brought in and the cover 7 is fixed to the caliper 16. After assembly the brake mechanism will be held together within the brake caliper 16 by screws 37 fixing the cover 7 to the caliper 16.

A person skilled in the art realises that the different embodiments of the bearing bracket, the lever and the intermediate part may be combined in many different ways.

What is claimed is:

1. A brake caliper and a brake mechanism for a disc brake received in said caliper, which brake mechanism comprises a brake lever, a cross bar, one or more thrust plates and a cover, characterized in that the caliper is of an open design having an opening in the wall furthest from the brake disc and that a bearing bracket is mounted from the inside of the caliper in said opening.

2. The brake caliper and mechanism of claim 1, characterized in that the bearing bracket has a shoulder for transmission of the reaction clamp force to the caliper and that a sealing is placed between the caliper and the bearing bracket in a groove of the shoulder of the bearing bracket.

3. The brake caliper and mechanism of claim 1, characterized in that the opening of the caliper allows machining of the inside of the caliper through said opening.

4. The brake caliper and mechanism of claim 1, characterized in that the bearing bracket forms a module of the brake mechanism together with the lever of the brake mechanism and that the rest of the brake mechanism forms one module held together by a sweep.

5. The brake caliper and mechanism of claim 4, characterized in that the lever is fixed to the bearing bracket by means of clips.

6. The brake caliper and mechanism of claim 1, characterized in that an adjuster mechanism is furnished for adjustment of the clearance between the brake pads and the brake disc, and that the adjuster mechanism is a part of a synchronisation unit also comprising adjustment and reset shafts.

7. The brake caliper and mechanism of claim 6, characterized in that the synchronisation unit is placed in the bearing bracket.

8. The brake caliper and mechanism of claim 7, characterized in that the adjuster mechanism is placed on a synchronising shaft connecting the adjustment and reset shafts by means of pinions and crown wheels.

9. The brake caliper and mechanism of claim 7, characterized in that the adjuster mechanism is furnished on an adjustment shaft on top of and adjacent a thrust screw.

10. The brake caliper and mechanism of claim 6, characterized in that the synchronization unit comprises one or more gear wheels placed between and drivingly connected to the adjustment and reset shafts.

11. The brake caliper and mechanism of claim 9, characterized in that the lever is acting on the cross bar by means of an intermediate part.

12. The brake caliper and mechanism of claim 11, characterized in that the intermediate part is a rocker received in a groove of the cross bar.

13. The brake caliper and mechanism of claim 11, characterized in that the intermediate part is a stud.

14. The brake caliper and mechanism of claim 11, characterized in that force amplification characteristics of the brake mechanism is controlled by amending the form and/or the positions of the surfaces in contact of the lever and intermediate part and/or the length of the lever.

15. The brake caliper and mechanism of claim 11, characterized in that the cover is fixed to the caliper and that a return spring is positioned between and acting on the cross bar and the cover.

16. The brake caliper and mechanism of claim 15, characterized in that the cross bar is guided in the caliper in such a way that it is allowed to move in the thrust direction and in the tangential direction of the brake disc.

17. The brake caliper and mechanism of claim 16, characterized in that the lever, the intermediate part and the one or more thrust plates are movable together with the cross bar.

* * * * *